(12) United States Patent
Hatzikakidis (10) Patent No.: US 9,415,815 B2
(45) Date of Patent: Aug. 16, 2016

(54) REPAIR AND/OR RECONPAIR OF SYMMETRICAL, REVOLVING, DIHEDRAL, SEMI-PERMEABLE AERODYNAMIC DEVICES

(71) Applicant: Dimitrios A. Hatzikakidis, Attikis (GR)

(72) Inventor: Dimitrios A. Hatzikakidis, Attikis (GR)

( * ) Notice: Subject to any disclaimer, the term of this patent is extended or adjusted under 35 U.S.C. 154(b) by 0 days.

(21) Appl. No.: 14/521,151

(22) Filed: Oct. 22, 2014

(65) Prior Publication Data

US 2015/0232136 A1 Aug. 20, 2015

Related U.S. Application Data

(63) Continuation of application No. 13/640,204, filed as application No. PCT/GR2011/000015 on Apr. 8, 2011, now Pat. No. 8,870,264.

(51) Int. Cl.
*B62D 35/00* (2006.01)
*B60T 1/16* (2006.01)
*G05D 3/12* (2006.01)

(52) U.S. Cl.
CPC .............. *B62D 35/007* (2013.01); *B60T 1/16* (2013.01); *G05D 3/12* (2013.01)

(58) Field of Classification Search
CPC ........... B62D 35/007; B60T 1/16; G05D 3/12
See application file for complete search history.

(56) References Cited

U.S. PATENT DOCUMENTS

| | | | | |
|---|---|---|---|---|
| 2,976,582 | A * | 3/1961 | Rosenthal | E04B 2/827 16/235 |
| 3,768,646 | A * | 10/1973 | Grannen | B03D 1/01 209/166 |
| 4,117,900 | A * | 10/1978 | Amick | B62D 35/00 180/7.1 |
| 6,183,041 | B1 * | 2/2001 | Wilson | B60J 1/20 296/180.1 |
| 6,378,932 | B1 * | 4/2002 | Fasel | B62D 35/001 180/903 |
| 6,382,708 | B1 * | 5/2002 | Erdelitsch | B62D 35/007 180/903 |
| 6,520,564 | B1 * | 2/2003 | Liang | B62D 35/00 180/903 |
| 6,565,145 | B2 * | 5/2003 | Pettey | B62D 35/007 180/903 |
| 7,111,898 | B2 * | 9/2006 | Rinklin | B62D 35/007 296/180.1 |
| 7,150,494 | B2 * | 12/2006 | Bangle | B32B 5/24 296/180.5 |
| 7,175,229 | B2 * | 2/2007 | Garcia | B62D 35/007 296/180.1 |
| 2008/0116717 | A1 * | 5/2008 | Honeycutt | B62D 37/02 296/180.5 |

FOREIGN PATENT DOCUMENTS

| | | | | |
|---|---|---|---|---|
| FR | 1432646 | A * | 3/1966 | B62D 35/00 |
| GB | 713277 | A * | 8/1954 | B62D 37/02 |

* cited by examiner

*Primary Examiner* — Lori L Lyjak
(74) *Attorney, Agent, or Firm* — John P. White; Cooper & Dunham LLP (57) ABSTRACT

A system using pairs of symmetrical aerodynamic devices (1) and (2) that affects the axial, the lateral response and handling of road vehicles. The symmetrical, dihedral revolving surfaces are controlled in an active and adaptive way, and are deployed independently, or in tandem, as a result of the drivers' control inputs (steering and braking), affecting the formation of the trailing vortices generated by the vehicle. Depending on the rotation of the devices, about axes (16) and (17), the concave and/or the convex sides of the aerodynamic surfaces, which are created by the dihedral angle (9), are exposed to the on-coming air flow. Their angular positioning, their orientation, and the semi-permeable condition of their central cavities (13), via the central cavity relief openings (11) and holes (14), determine the generation of drag and side forces differentially, by affecting the formation of the trailing vortices, and thus affecting the vehicles' handling.

3 Claims, 9 Drawing Sheets

REPAIR AND/OR RECONPAIR OF SYMMETRICAL, REVOLVING, DIHEDRAL, SEMI-PERMEABLE AERODYNAMIC DEVICES

CROSS-REFERENCE TO RELATED APPLICATIONS

This application is a continuation of U.S. Ser. No. 13/640,204, filed Jan. 28, 2013, now allowed, which is a §371 national stage of PCT International Application No. PCT/GR2011/000015, filed Apr. 8, 2011, which claims priority of Greek Patent Application No. 20100100217, filed Apr. 9, 2010, the entire contents of each of which are hereby incorporated by reference into the subject application.

SUMMARY

The present invention relates to a pair of symmetrical aerodynamic devices for use in vehicles, especially a motor vehicle, such as a car.

The existing variable-geometry aerodynamic devices, used in road vehicles, act as reaction surfaces. These devices usually are deployed by rotation about a horizontal axis, interfering with the free-stream, acting as an air-brake or a Boundary Layer spoiler.

With the present innovation a pair of symmetrical variable-geometry aerodynamic devices, act not only as reaction surfaces to induce a drag force, but as a mechanism to act on the trailing vortices of the road vehicle. In this way, the aerodynamic input generated due to the deployment, and the active control of the devices, affect the axial and the lateral response and the handling of the vehicle, as well as the total drag and side forces induced. This is achieved by the differential deployment of the two aerodynamic devices, that can be rotated independently, or in tandem, acting on and affecting the formation of the trailing vortices on the two sides of the vehicle.

According invention, this objective is achieved by the movement, in the form of rotation, of the two symmetrical, revolving, dihedral, semi-permeable devices, as defined in independent claim 1. The dependent claims define preferred embodiments of the invention.

Each of the two devices have a concave and a convex side. Prior to deployment, the devices are positioned symmetrically, with their concave surfaces opposed, facing each other, and their convex surfaces facing outwards on each side of the vehicle.

According to a preferred embodiment, the set of the two symmetrical aerodynamic devices have such a shape, so that their independent rotation can induce a higher drag force on the one side of the vehicle, when the concave surface of the one device is exposed to the on-coming air-flow, and a lower drag force on the other side, when the convex surface of the other device, is exposed to the on-coming air-flow.

In the following, a preferred embodiment of the invention will be discussed in more detail with reference to the accompanying drawings.

The invention will be made conceivable with reference to the designs that accompany the present description, in which certain proposed industrial applications of the invention are shown.

DETAILED DESCRIPTION

FIG. 1-FIG. 9 show a preferred embodiment of the invention. While this particular embodiment will be described in detail below, several modifications will be appreciated by a person skilled in the art, so that the invention shall not be interpreted in a limited manner, referring to the description and the drawings. Rather the invention is defined by the appended claims.

Referring to a selected indicative example of industrial application of the invention, a number of the main sections and components of the devices are listed below. More specifically, the basic parts of the invention are the following:
 1. left aerodynamic device,
 2. right aerodynamic device,
 3. vehicle,
 4. base of the aerodynamic device,
 5. control mechanism for rotation,
 6. support module of the control mechanism,
 7. support and connecting structure,
 8. leading edge profiling of the aerodynamic surface,
 9. dihedral angle,
 10. top end profile,
 11. central cavity section relief opening,
 12. trailing edge profiling,
 13. central cavity section contouring,
 14. variable permeability holes,
 15. lower end profiling of the leading edge,
 16. axis of rotation of the left aerodynamic device,
 17. axis of rotation of the right aerodynamic device.

In FIGS. 1-9, reference numeral 1 designated the left aerodynamic device fitted on a vehicle (3). The left aerodynamic device (1), is based onto a base (4), controlled via a control mechanism (5), which is supported through the support module (6), and is connected to its symmetrical aerodynamic device (2), via the support structure (7). See FIG. 3.

Each aerodynamic device can move, either independently, or in tandem with the other, and features a central cavity section (13) contouring. This concave surface is created due to the dihedral angle (9), that splits the aerodynamic surface into the upper and the lower sections, resembling a base-ball glove. (See FIG. 2). The corresponding convex surface on the other side, allows the flow of air through the variable permeability holes (14), and the central cavity relief opening (11), which is served by a butterfly orifice. See FIG. 2

According to the preferred embodiment shown in the drawing, (FIG. 4), the rotation of the left device (1), about an axis (16), through an angle of 90 degrees (FIG. 5), causes the flow of air over the left device (1), while the exposed concave surface of the right device (2), concentrates the flow onto the concave section. (See FIG. 6).

Figure 1:
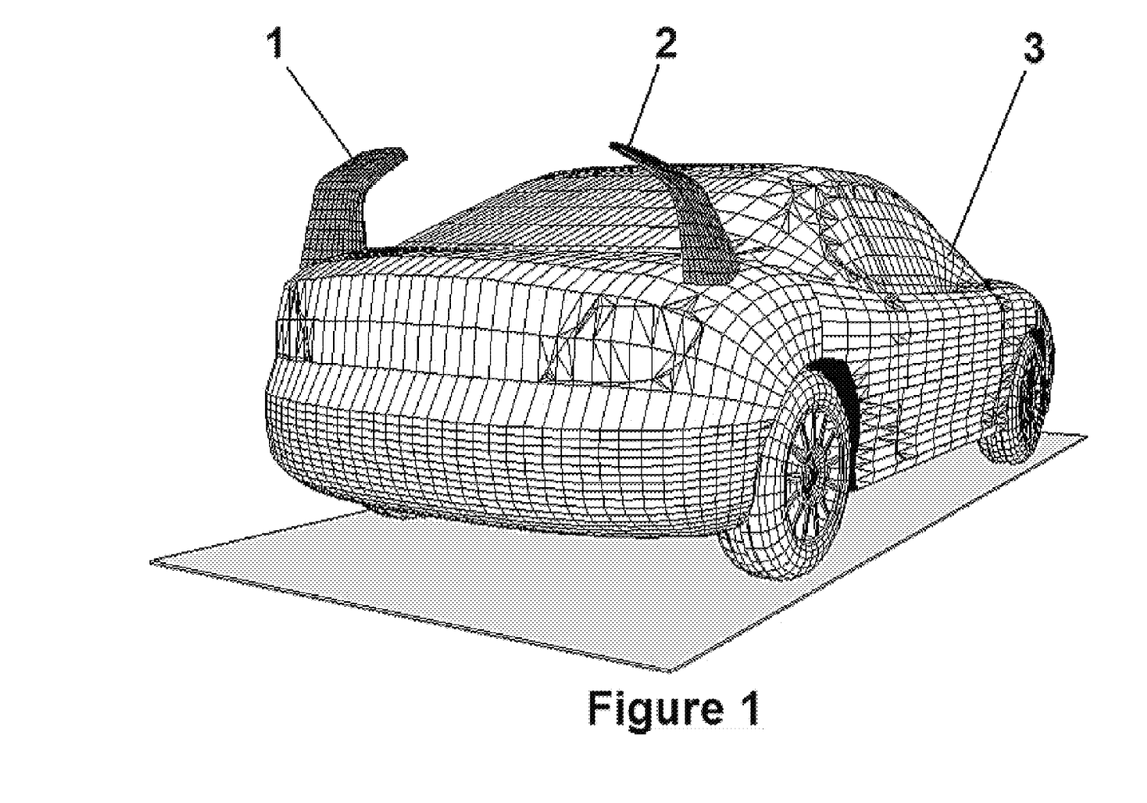
Referring to FIG. 1, the pair of the aerodynamic devices is shown, in the low-drag position. The pair shown is located at the tail section of a car. The aerodynamic devices before deployment, rest at their original position of symmetry, about the centre plane of the vehicle.
Figure 2:
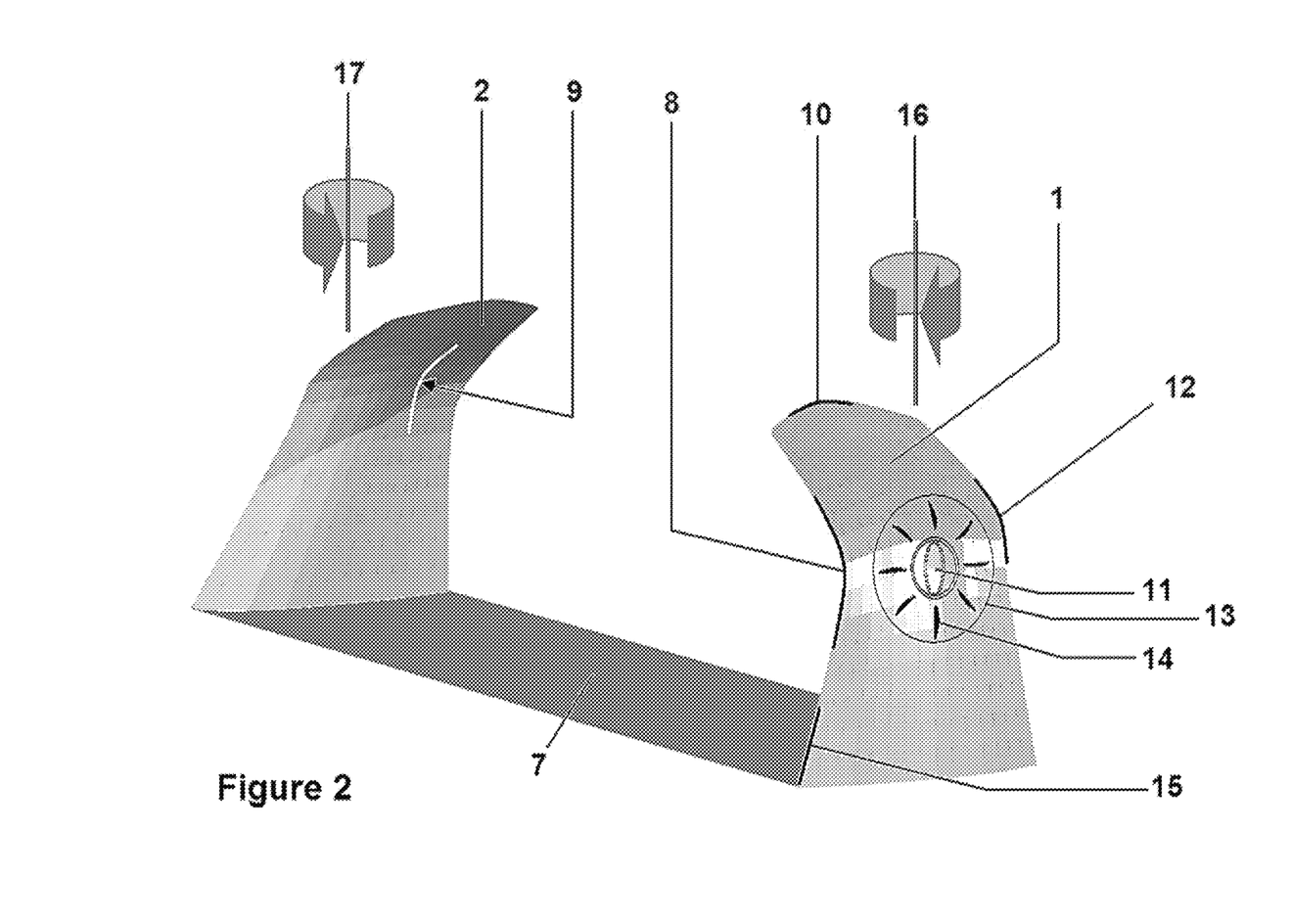
In FIG. 2, the two aerodynamic surfaces of the devices are shown in some detail. The axes of rotation of the two devices are also shown.
Figure 3:
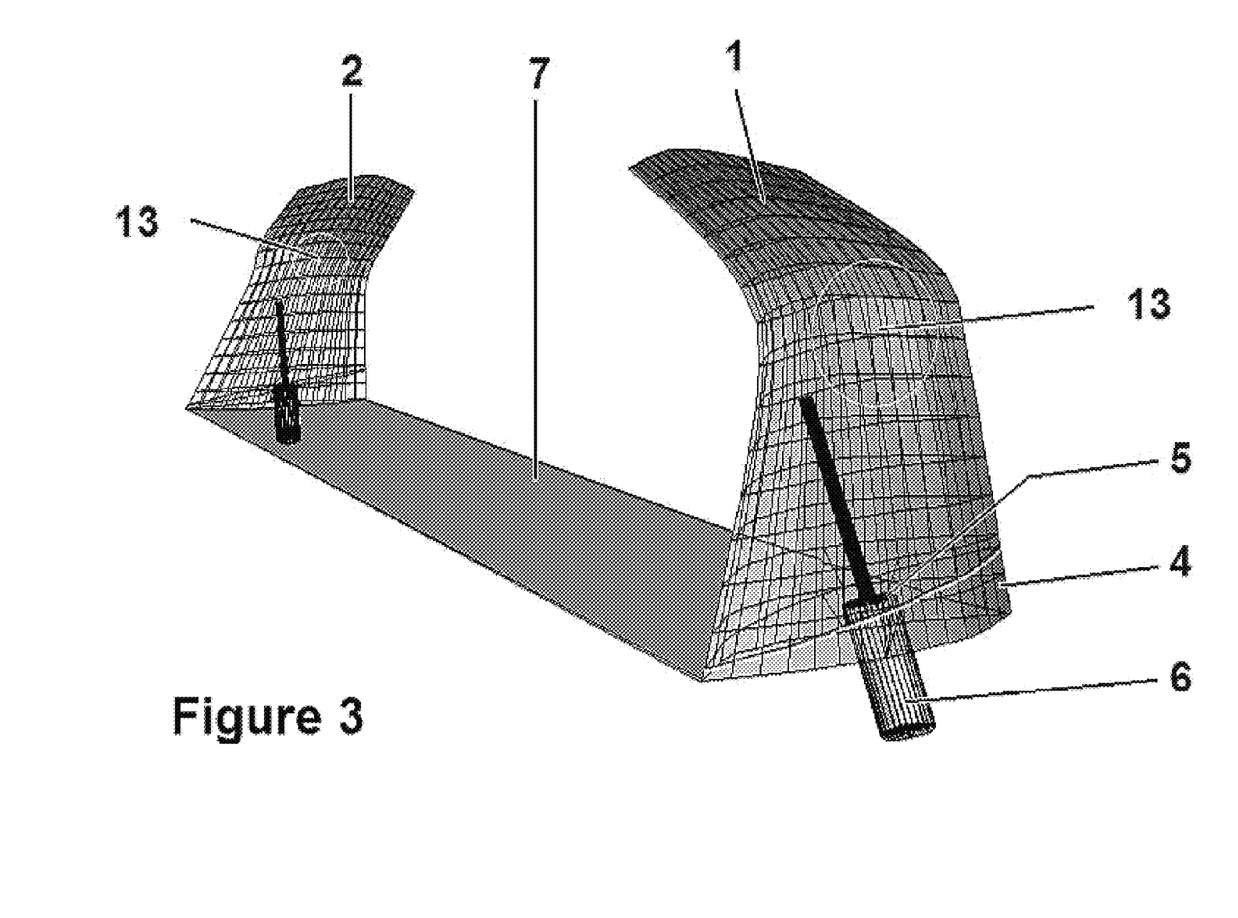
In FIG. 3, the moving and stationary parts of the devices are shown.
Figure 4:
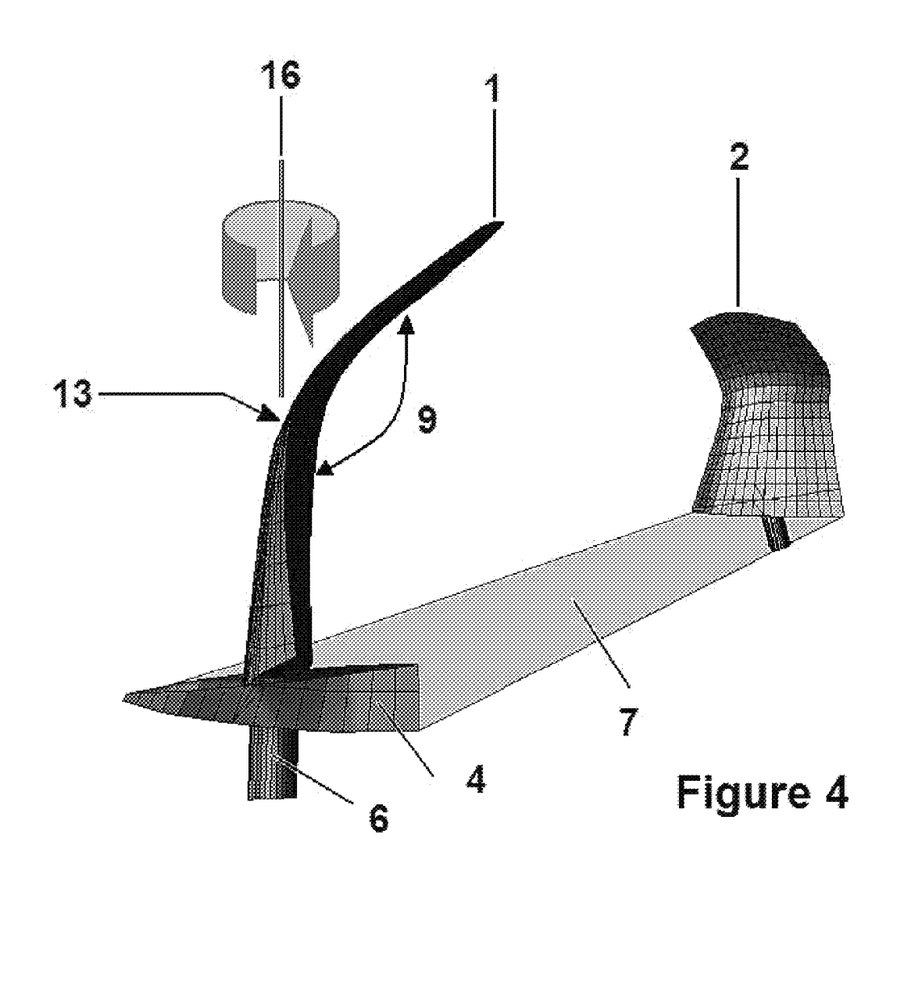
FIG. 4, shows the left aerodynamic device that has been deployed, while the right device remains in its original position. The left device has been rotated clock-wise.
Figure 5:
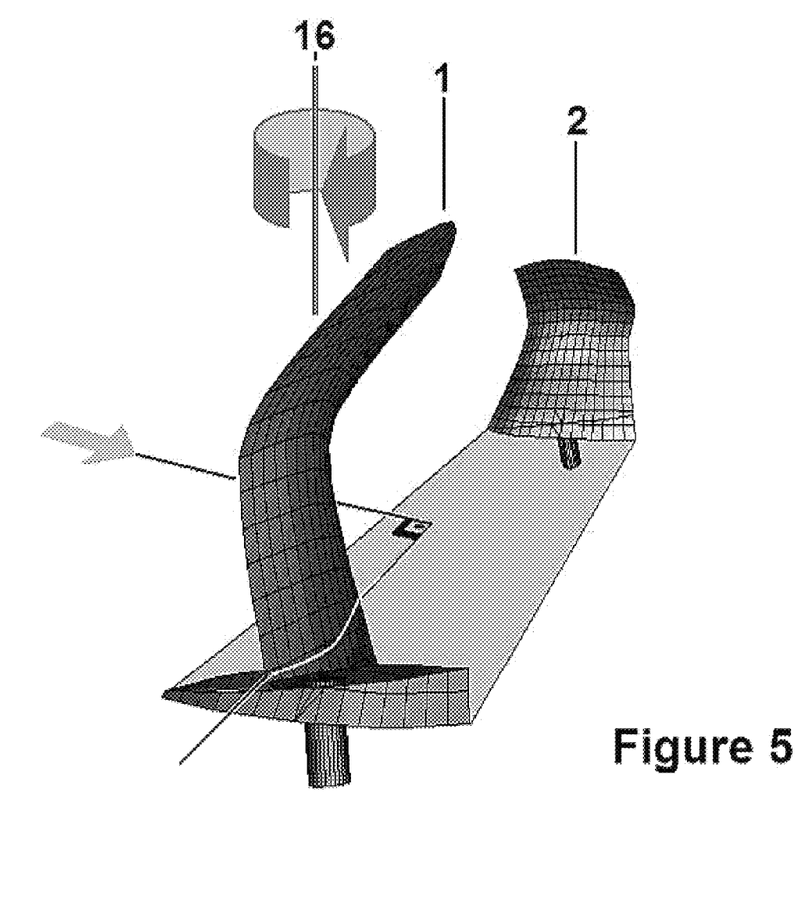
In FIG. 5, the left aerodynamic device has been rotated by 90 degrees, while the right remains facing forward. The left surface is at right angles to the free stream.
Figure 6:
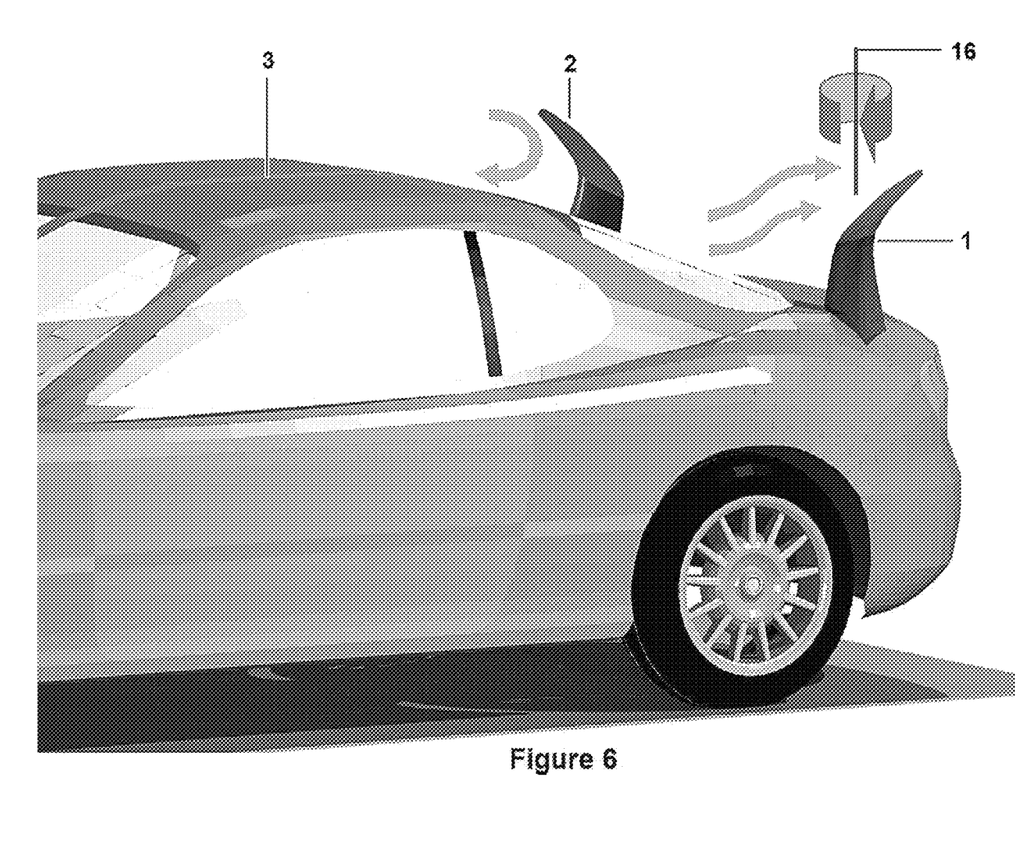
In FIG. 6, a vehicle is shown with a pair of symmetrical aerodynamic devices fitted at its tail section. The two devices have been differentially rotated. The left has been rotated by 90 degrees, following the flow, (exposing its convex surface to the air-flow), while the right has been counter-rotated, opposing the aerodynamic flow, (exposing its concave surface to the air-flow).
Figure 7:
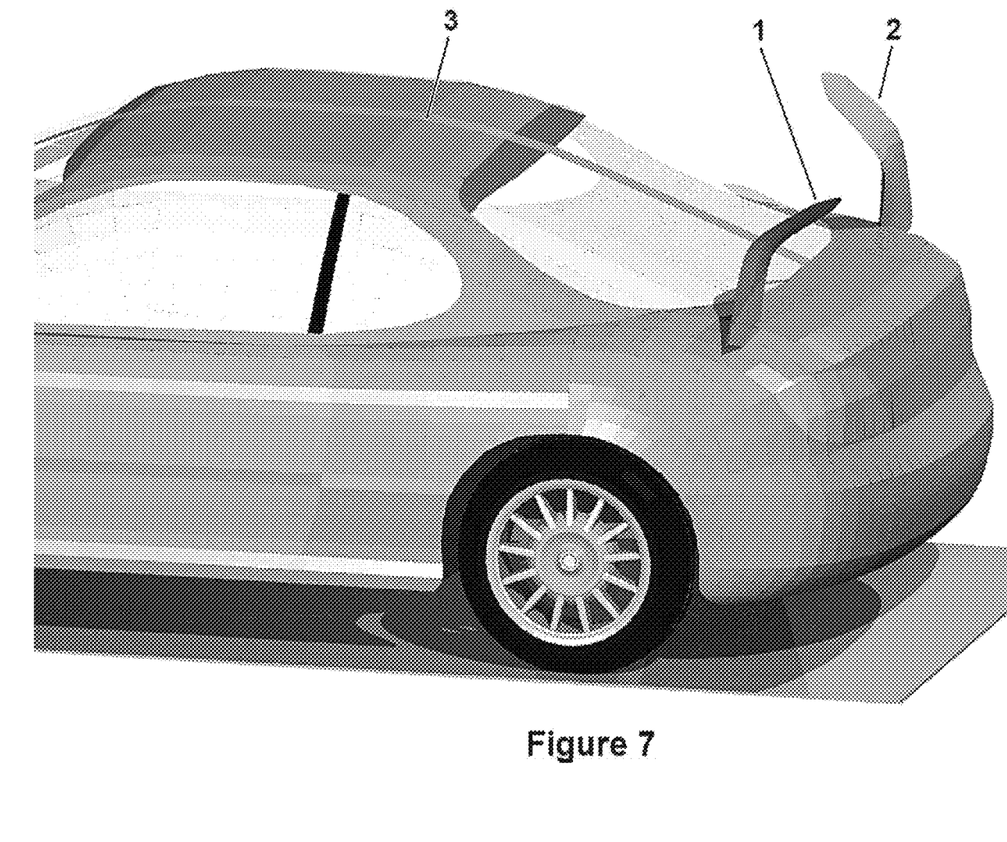
In FIG. 7, (which is as FIG. 6, using a different perspective), the aerodynamic devices, fitted at the tail section of a vehicle, have been deployed and have been rotated through their respective angles of rotation, cause a right rotation on the vehicle.

The conditions shown in FIG. 7, result in the differential generation of drag and lateral forces that cause the vehicle (3) to rotate to the right.

The control inputs of the driver, with respect to steering and braking, are processed running active-adaptive control routines, to activate the rotations of the two devices (1) and (2).

The aspects of the profiling of the aerodynamic devices (1) and (2), as a result of the leading edge profiling (8), trailing edge profiling (12), top end profiling (10), lower end profiling of the leading edge (15), and the dihedral angle (9), determine the effect on the formation of the trailing vortices generated, and subsequently, the differential lateral and drag forces generated on the vehicle, when the devices rotate about their respective axes (16) and (17).

Figure 9:
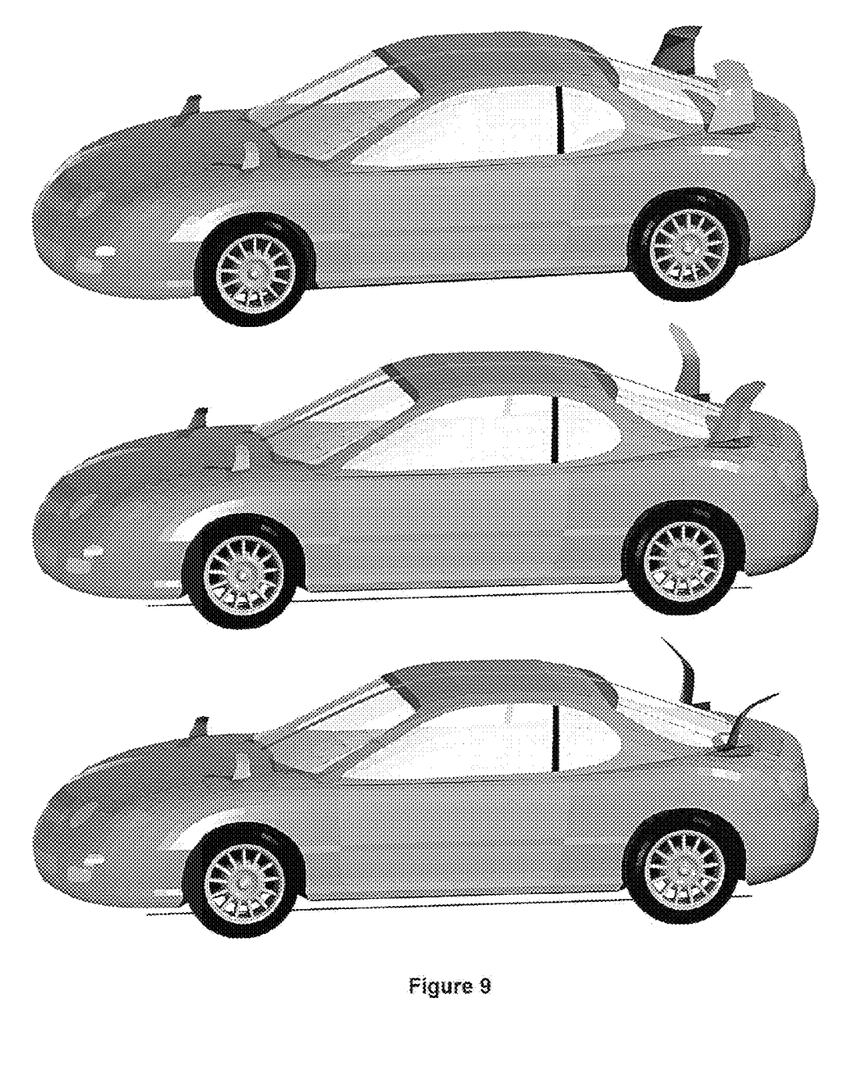
In FIG. 9 the sequence of the independent rotation of the symmetrical aerodynamic devices is shown.

The sequence by which a pair of devices fitted at the tail section of the vehicle are independently rotated, to introduce a rotational input towards the right on the vehicle, is shown on FIG. 9.

Alternatively, the two symmetrical devices could work as a air-brake, if both devices expose their concave surfaces to the on-coming flow.

Figure 8:
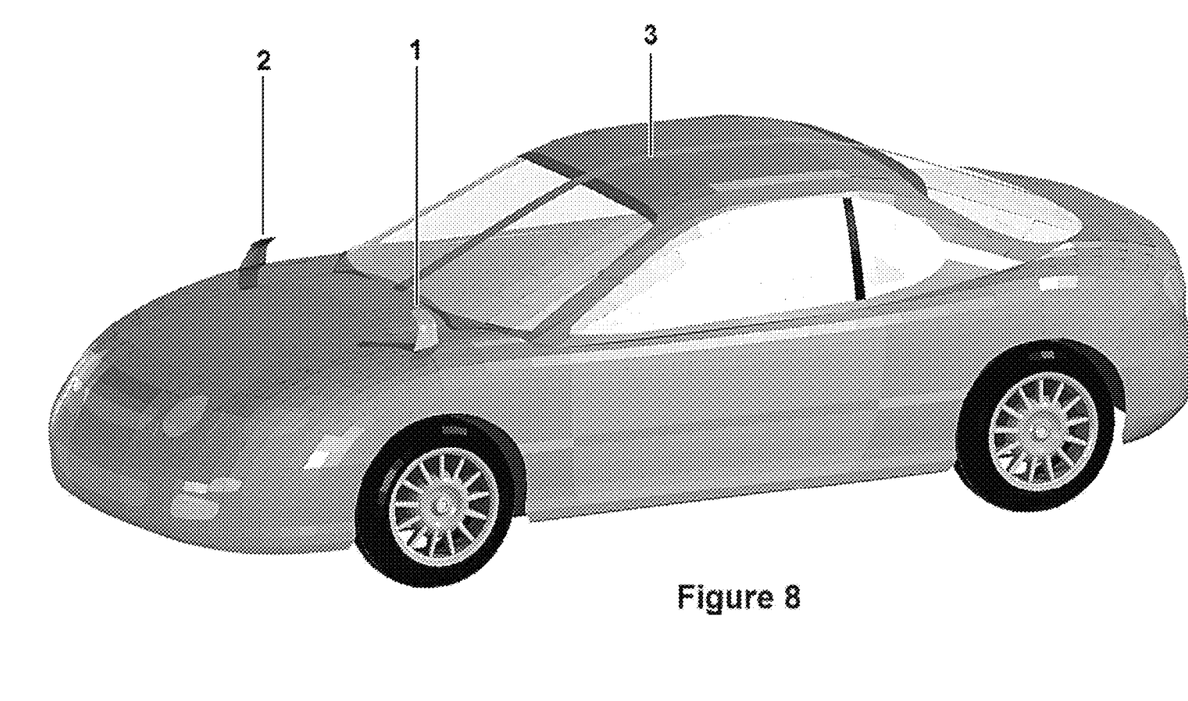
FIG. 8 shows a pair of devices fitted on the upper front section of a vehicle.

FIG. 8 shows an alternative position of a pair of symmetrical devices (1) and (2) of smaller size, fitted on the front section of a car.

The invention claimed is:

1. A vehicle including a pair of symmetrical, revolving, dihedral, semi-permeable aerodynamic devices, the aerodynamic devices comprising one left such device (1),
   featuring a central cavity section (13), leading edge profiling (8), trailing edge profiling (12), top end profiling (10), lower end profiling of the leading edge (15), dihedral angle (9), central cavity section relief opening (11), variable permeability holes (14), and is based on a base (4),
   which can rotate about an axis of rotation (16), via a control mechanism (5), which is to supported through the support module (6),
   which is capable to move independently of, or in tandem with, one right such device (2), (which is symmetrical to the left device (1)), and which can rotate about an axis of rotation (17),
   and is connected via a support structure (7),
   the aerodynamic devices depending on their size and form are fitted on the vehicle in any position determined by the aerodynamic effectiveness of the devices,
   the devices (1),(2) can rotate dock-wise as well as counter-clock-wise, independently, or in tandem, and
   the dihedral angle (9), effectively splits each aerodynamic device into an upper and a lower section, and forms the central cavity section (13), which resembles a base-ball glove, which has a concave (inner) and a convex (outer) surface, due to the contouring of the inner and outer surfaces.

2. The vehicle as claimed in claim 1, wherein the pair of symmetrical, revolving, dihedral, semi-permeable aerodynamic devices, comprising one left such device (1) and one right such device (2), operates in addition to pairs of various sizes, fitted in other positions on the external surface of the vehicle,
   wherein the devices are used in tandem as an air-brake, when their concave sides face the on-coming air flow,
   wherein the devices are used independently with one device exposing its concave surface to the on-coming flow, while the other (symmetrical device) exposes its convex surface to the on-coming flow, thus introducing a braking as well as a turning input on the vehicle, thus affecting the axial, the lateral response and the handling of the vehicle,
   wherein each central cavity relief opening (11) is released, opened and closed independently,
   wherein the pressure at the central cavity section (13), is controlled by varying the variable permeability holes (14), and is further adjusted at the central cavity relief opening (11), with a butterfly orifice, or equivalent opening, by means of mechanical, electromechanical or other means, or alternatively, the pressure at the central cavity section (13), is adjusted by means of elastic semi-permeable membrane,
   wherein the central cavity section (13) features a blowing/suction arrangement to assist the pressure regulation of the holes (14), and
   wherein the revolving motion of the devices which is performed in an active and adaptive manner, either moved independently or in tandem, act on and affect the formation of the trailing vortices generated at the sides of the vehicle, so that the drag and lateral forces acting on the vehicle are affected differentially by the action of the devices, thus, the total and differential drag and side forces affect the axial and directional lateral response and handling of the vehicle, with the control inputs of the driver, with respect to steering and braking, are processed running active-adaptive control routines, to activate the rotations of the two devices (1) and (2).

3. The vehicle according to claim 1 comprising several seta of symmetrical aerodynamic devices.

* * * * *